(12) United States Patent
Targiroff

(10) Patent No.: US 6,199,676 B1
(45) Date of Patent: Mar. 13, 2001

(54) INFLATABLE TUBULAR STRUCTURE WITH SPIRAL SEAM

(75) Inventor: Alexandre Targiroff, Road Howell, NJ (US)

(73) Assignee: Air Cruisers Company, Wall, NJ (US)

( * ) Notice: Subject to any disclaimer, the term of this patent is extended or adjusted under 35 U.S.C. 154(b) by 0 days.

(21) Appl. No.: 09/286,887

(22) Filed: Apr. 6, 1999

(51) Int. Cl.[7] ................................................ B65G 11/10
(52) U.S. Cl. .......................... 193/25 B; 441/84; 441/44; 441/40; 156/322; 242/118.31
(58) Field of Search .................. 193/25 B; 156/322; 138/93; 242/118.31; 441/84, 44, 45, 46, 40, 41, 42, 54, 66, 67, 129, 130, 131

(56) References Cited

U.S. PATENT DOCUMENTS

| | | |
|---|---|---|
| 2,445,883 | 7/1948 | Katz et al. . |
| 2,676,127 | 4/1954 | Hansen . |
| 3,554,237 * | 1/1971 | Pelley et al. . |
| 3,607,517 * | 9/1971 | Pelley et al. ........................ 156/195 |
| 3,616,123 | 10/1971 | Reynolds, Jr. . |
| 3,616,819 | 11/1971 | Dunlap, Jr. et al. . |
| 3,642,034 * | 2/1972 | Ullman et al. ...................... 138/144 |
| 3,653,084 * | 4/1972 | Hartman ................................ 441/40 |
| 3,712,417 * | 1/1973 | Chacko et al. ......................... 182/48 |
| 3,739,815 | 6/1973 | Rejeski ................................ 138/122 |
| 3,916,953 | 11/1975 | Nagayoshi et al. ................. 138/129 |
| 3,926,223 * | 12/1975 | Petzetakis ............................ 138/129 |
| 4,081,302 | 3/1978 | Drostholm et al. .................. 156/190 |
| 4,239,064 * | 12/1980 | Gilman . |
| 4,246,980 * | 1/1981 | Miller .................................... 182/48 |
| 4,462,556 * | 7/1984 | Graham, Jr. ..................... 242/118.31 |
| 4,509,447 * | 4/1985 | Smith, Sr. .......................... 114/65 R |
| 4,582,734 * | 4/1986 | Miller . |
| 4,630,650 | 12/1986 | Davis .................................. 138/154 |
| 4,660,497 * | 4/1987 | Cochran ............................... 114/345 |
| 4,733,629 * | 3/1988 | Hunt et al. .......................... 114/357 |
| 4,788,089 | 11/1988 | Skipper ............................... 428/34.9 |
| 4,791,966 * | 12/1988 | Eilentropp .......................... 138/154 |
| 4,846,422 * | 7/1989 | Fisher ................................ 244/137.2 |
| 4,929,478 | 5/1990 | Conaghan et al. ................. 428/35.1 |
| 4,990,114 * | 2/1991 | LeBlanc, Jr. ........................... 441/80 |
| 5,211,654 * | 5/1993 | Kaltenbach .......................... 606/191 |
| 5,458,708 * | 10/1995 | Gardner et al. ........................ 156/64 |
| 5,542,628 * | 8/1996 | Nishimura et al. ............... 244/137.2 |
| 5,752,934 * | 5/1998 | Campbell et al. ..................... 604/96 |
| 5,768,928 * | 6/1998 | Carson .................................... 72/49 |
| 5,798,013 * | 8/1998 | Brandenburger . |
| 6,076,561 * | 6/2000 | Akedo et al. ........................ 138/149 |
| 6,077,376 * | 6/2000 | Katraro et al. ...................... 156/195 |

* cited by examiner

*Primary Examiner*—H. Grant Skaggs
*Assistant Examiner*—Richard Ridley
(74) *Attorney, Agent, or Firm*—Lawrence G. Fridman

(57) ABSTRACT

An inflatable structure comprises an inflatable tubular member that is constructed of an elongate, flexible strip of woven fabric that is impervious to air and water. The elongate strip has a first elongate edge and a second elongate edge and is spiraled into a tubular shape such that the first elongate edge is adjacent the second elongate edge to thereby form a spiral seam. A first elongate tape member is thermobonded to an inner surface of the tubular member along the length of the spiral seam for sealing the spiral seam from inside. A second elongate tape member is thermobonded to the outer surface of the tubular member along the length of the spiral seam for reinforcing the spiral seam.

26 Claims, 7 Drawing Sheets

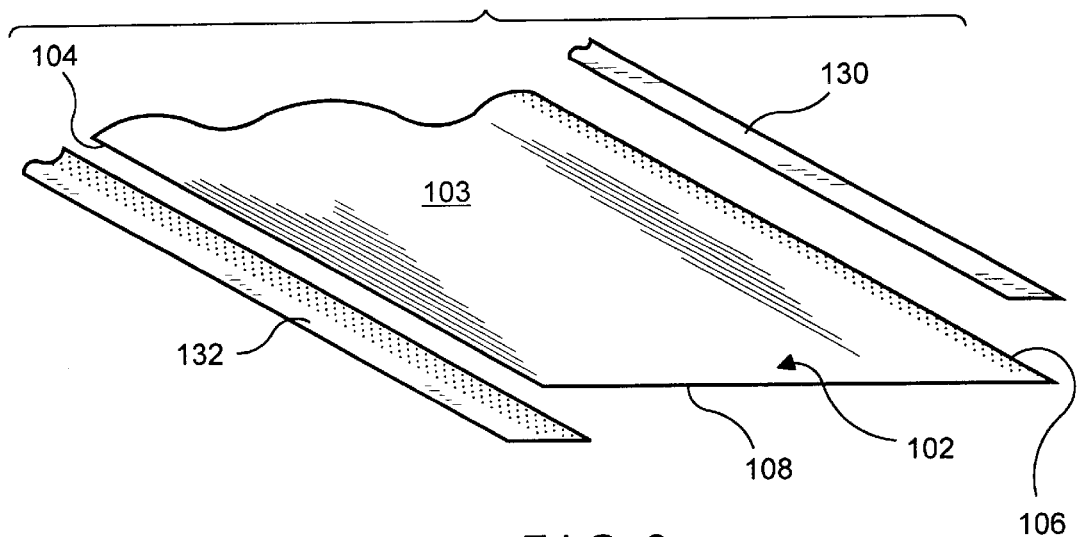
F I G. 8
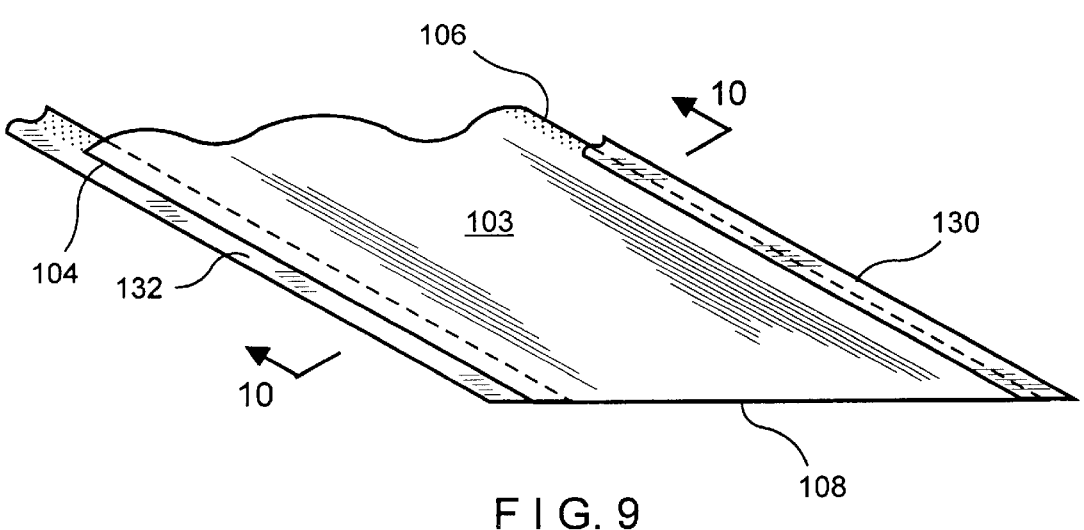
F I G. 9
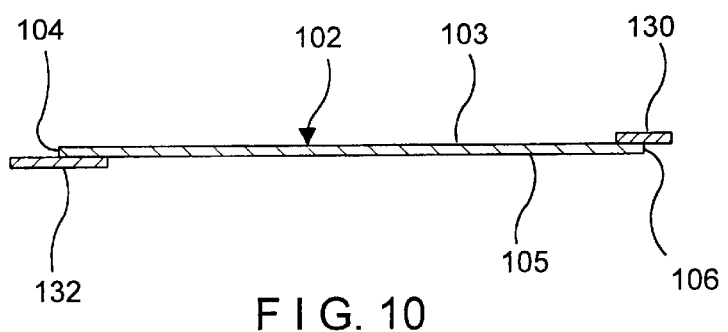
F I G. 10

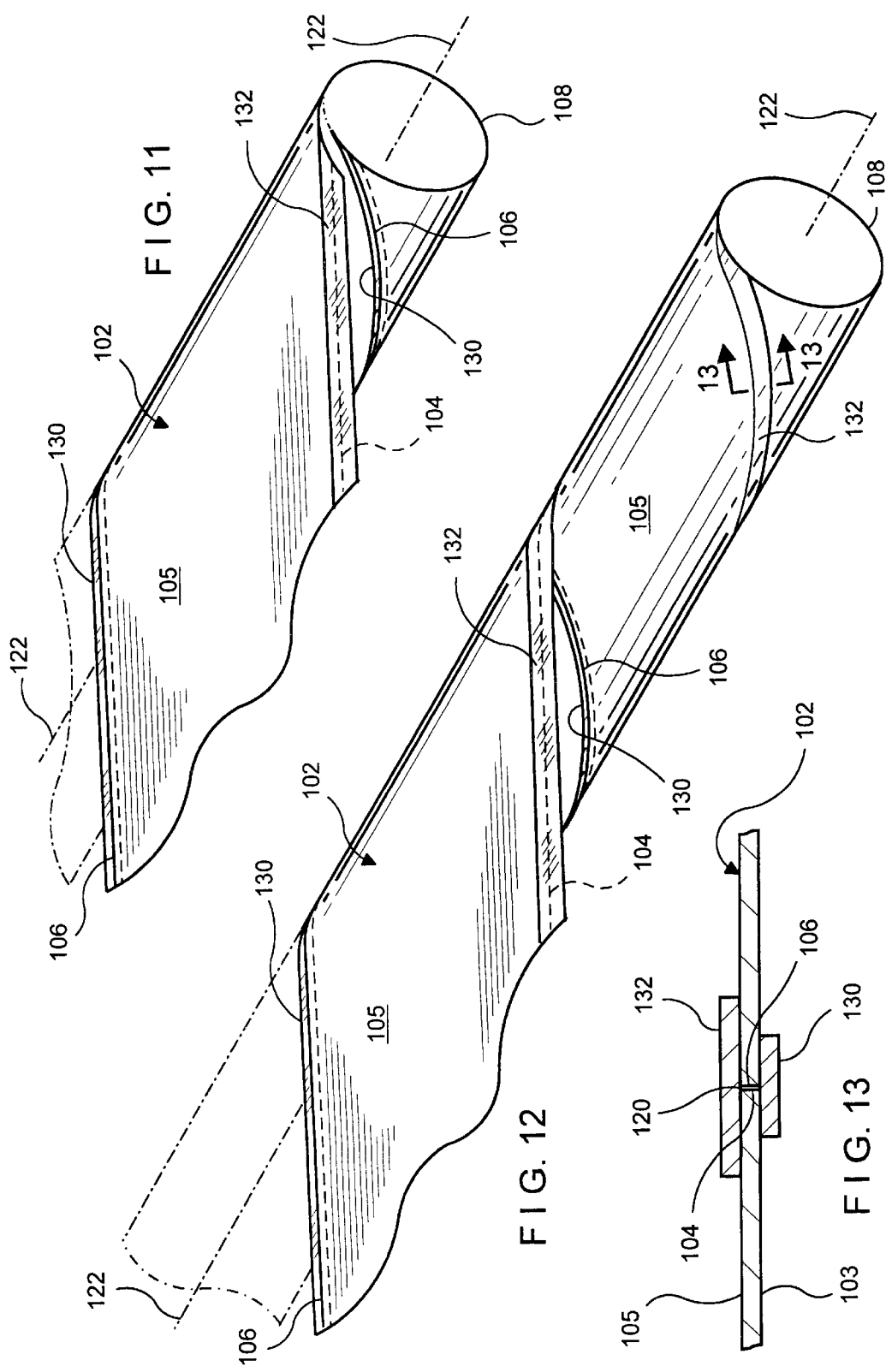

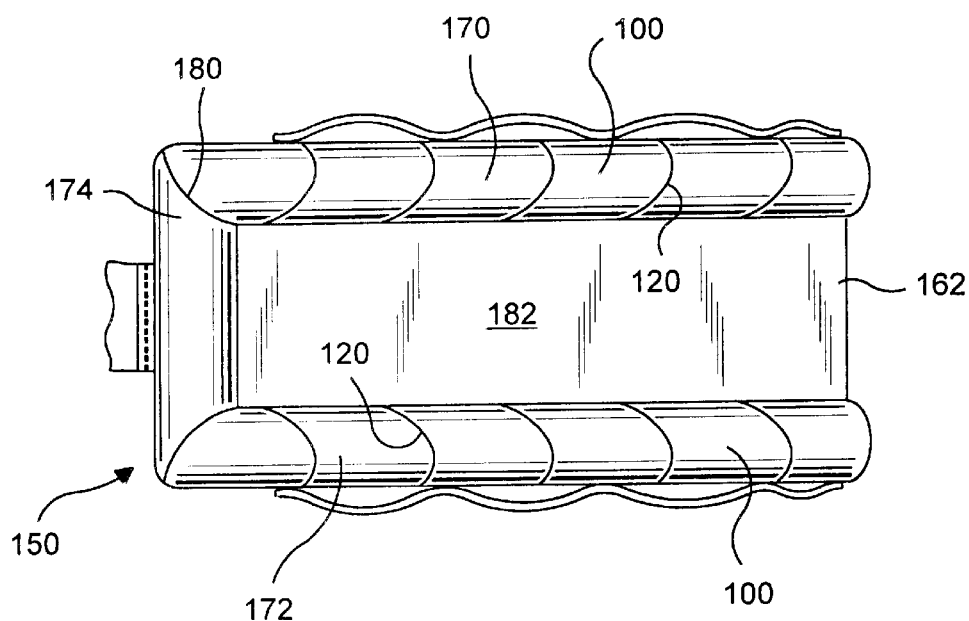
F I G. 15
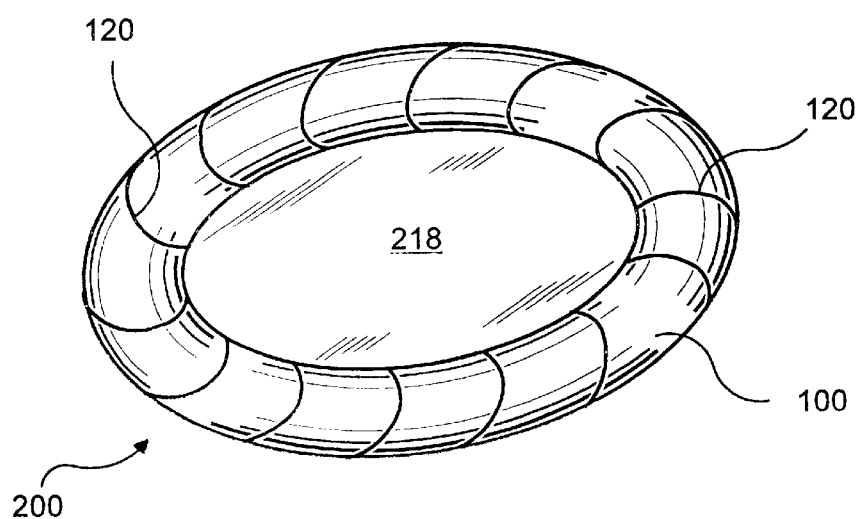
F I G. 16

INFLATABLE TUBULAR STRUCTURE WITH SPIRAL SEAM

BACKGROUND OF THE INVENTION

1. Field of the Invention

This invention relates generally to inflatable structures, and more particularly to inflatable tubular structures with helical seams.

2. Description of the Related Art

It is known in the prior art to construct inflatable structures of several pieces of material adhesively bonded together to form tubular members impervious to air and water. Such inflatable tubular members are often utilized in water floatation devices such as life rafts and inflatable evacuation devices for commercial aircraft.

As illustrated in FIGS. 1 and 2, a body of a prior art inflatable annular floatation device or raft 10 comprises four tubular segments 12, 14, 16 and 18 that are constructed of water and air impervious material. The tubular elements are adhesively bonded together at transverse circular seams 20, 22, 24, and 26. Each segment is arcuate in shape and includes a lower wall 28 adhesively bonded to an upper wall 30 at an inner seam 32 and an outer seam 34. Thus, the annular floatation device 10 comprises a total of twelve adhesively bonded seams that may be subject to leakage due to improper assembly, over-inflation of the floatation device 10, cyclic loading and unloading due to inflation and deflation, wear, and the like. Overlapping or cross-over seam areas at the intersections of the inner and outer seams and the transverse seams are especially vulnerable to leakage.

During construction of the prior art floatation device 10, and with additional reference to FIG. 3, each segment 12, 14, 16 and 18 is manually formed by cutting woven material such that the warp 36 of the material is oriented parallel to the longitudinal axis 40 of the tubular member and the fill 38 is oriented transverse to the longitudinal axis. As shown, the warp 36 extends parallel to the seams 32 and 34 in order to prevent twisting of the floatation device 10 during inflation and operation. However, such warp direction requires special orientation of fabric during the cutting which further complicates the assembly process and results in a significant amount of material waste. Moreover, each wall 28, 30 of each segment must be laid out separately prior to applying adhesive. A substantial amount of labor is therefore required to piece the walls and segments together.

The above-described problems are further augmented by the long curing time of adhesives used to bind the seams together. The formation of each seam requires the application of a suitable layer of adhesive between overlapping areas of the walls and segments. Each seam must be formed separately and typically must be cured for at least four hours before forming a subsequent seam, which also must be cured for at least four hours, and so on. Inflating and testing the floatation device 10 cannot take place until the final seam is completely cured. With a total of twelve seams for the prior art annular floatation device 10, much manufacturing time is lost due to the long curing process.

Another drawback associated with this prior art inflatable arrangement is illustrated in FIG. 4. As shown, the outer seam 34 and inner seam 32 of each tubular segment 12, 14, 16 and 18 are subject to a circumferential force $F_c$ when the device 10 is inflated. The circumferential force $F_c$ extends normal to the seams 32 and 34 and therefore equals the normal force $F_n$ acting on the seams. The normal force $F_n$ tends to pull the seams 32 and 34 apart. This is especially prevalent when the device 10 is over-inflated or when too much external force is applied to the walls of the inflatable device 10.

SUMMARY OF THE INVENTION

It is therefore an object of the present invention to provide an inflatable device in general and an inflatable evacuation or floating device in particular that reduces manufacturing time and material waste.

It is a further object of the present invention to strengthen the seams while reducing the amount of normal force normally acting on the seams to thereby provide a high degree of reliability of the inflatable device.

It is an even further object of the present invention to provide an inflatable device that is relatively inexpensive and easy to manufacture.

According to one aspect of the present invention, an inflatable evacuation device includes at least a first inflatable tubular member, a second inflatable tubular member spaced from the first inflatable tubular member, and a floor extending between the first and second inflatable tubular members. Each of the first and second inflatable tubular members are constructed of an elongate, flexible strip of woven fabric that is substantially impervious to air and water. The elongate strip has a first elongate edge and a second elongate edge extending substantially parallel to the first elongate edge. The elongate strip is spiraled into a tubular shape such that the first elongate edge is adjacent the second elongate edge to thereby form a spiral seam. Preferably, first and second tape members are thermobonded to the inner and outer surfaces, respectively, of each tubular member along the length of the spiral seam. A warp direction of the woven fabric is preferably substantially parallel to the spiral seam while a bias direction of the fabric extends along a circumference of each tubular member.

According to a further aspect of the invention, an inflatable annular floating structure comprises an inflatable tubular member that is constructed of an elongate, flexible strip of woven fabric that is substantially impervious to air and water. The elongate strip has a first elongate edge and a second elongate edge extending substantially parallel to the first elongate edge. The elongate strip is spiraled into a tubular shape such that the first elongate edge is adjacent the second elongate edge to thereby form a spiral seam and inner and outer tubular surfaces. A first elongate tape member is bonded to one of the inner and outer surfaces of the tubular member along the spiral seam. Preferably, the first elongate tape member is bonded to the inner surface of the tubular member along the spiral seam for sealing the spiral seam. A second elongate tape member can be bonded to the outer surface of the tubular member along the spiral seam for reinforcing the spiral seam.

According to an even further aspect of the invention, a method of forming an inflatable structure includes the steps of: providing an elongate, flexible strip of woven fabric that is substantially impervious to air and water, the elongate strip having a first elongate edge and a second elongate edge extending substantially parallel to the first elongate edge, with a warp direction of the woven fabric extending substantially parallel to the first and second elongate edges; spiraling the elongate strip into a tubular member such that the first elongate edge is adjacent the second elongate edge to thereby form a spiral seam and inner and outer tubular surfaces; and bonding at least a first elongate tape member to one of the inner and outer surfaces of the tubular member along the spiral seam. Preferably, the first elongate tape member is bonded to the inner surface of the tubular member along the spiral seam for sealing the spiral seam and a second elongate tape member is bonded to the outer surface of the tubular member along the spiral seam for reinforcing the spiral seam.

Preferably, the bonding step includes thermobonding the first and second elongate tape members to the inner and outer surfaces, respectively, of the tubular member.

There are, of course, additional features of the invention that will be described hereinafter which will form the subject matter of the appended claims. Those skilled in the art will appreciate that the preferred embodiments may readily be used as a basis for designing other structures, methods and systems for carrying out the several purposes of the present invention. It is important, therefore, that the claims be regarded as including such equivalent constructions since they do not depart from the spirit and scope of the present invention. The foregoing and other features and advantages of the invention will be apparent from the following more particular description of preferred embodiments of the invention, as illustrated in the accompanying drawings.

BRIEF DESCRIPTION OF THE DRAWINGS

The preferred embodiments of the present invention will hereinafter be described in conjunction with the appended drawings, where like designations denote like elements, and which drawings are provided to illustrate and not to limit the invention; and in which:

FIG. 8 is an orthographic view of the inflatable tubular member of the present invention at a first stage of assembly;

FIG. 9 shows the inflatable tubular member of the invention at a second stage of assembly;

FIG. 10 is a cross section of the inflatable tubular member taken along line 10—10 of FIG. 9 during the second stage of assembly;

FIG. 11 is an orthographic view of the inflatable tubular member of the invention at a third stage of assembly;

FIG. 12 is an orthographic view of the inflatable tubular member of the invention at a fourth stage of assembly;

FIG. 13 is a cross section of the inflatable tubular member taken along line 13—13 of FIG. 12;

FIG. 15 is a perspective view of an escape chute for aircraft using helically seamed tubular members according to the invention; and FIG. 16 is an orthographic view of an inflatable annular floatation device using helically seamed tubular members according to the invention.

DETAILED DESCRIPTION OF THE PREFERRED EMBODIMENTS

Figure 6:
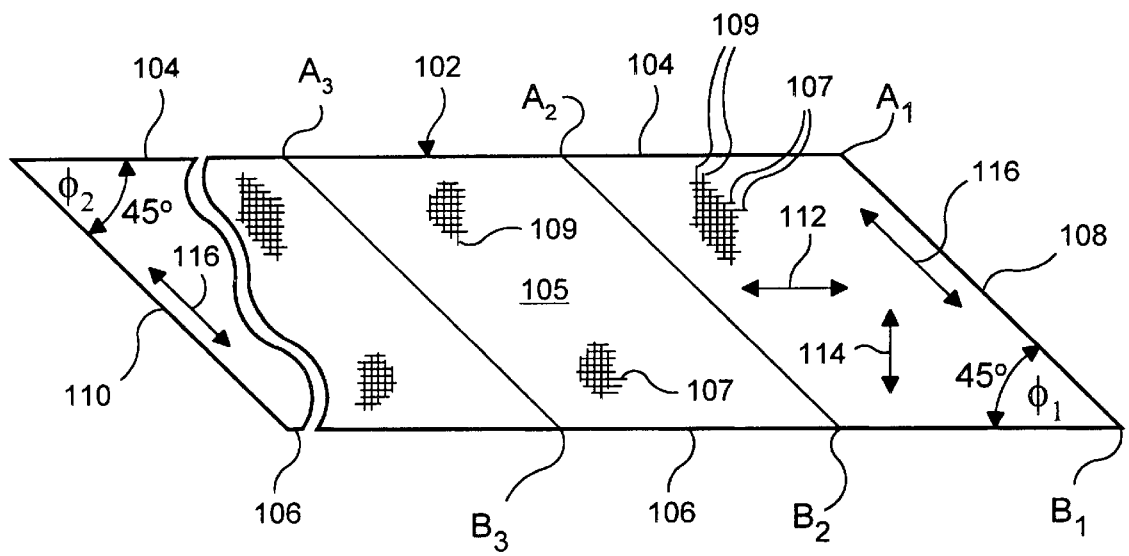
FIG. 6 is an orthographic top plan view of a strip of material used to form the tubular member of FIG. 5.
Figure 5:
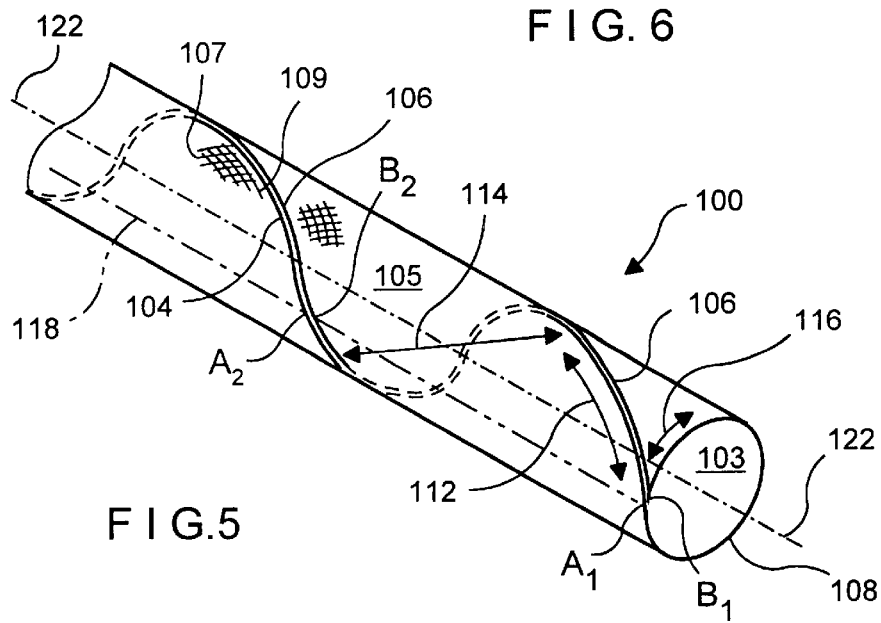
FIG. 5 is a partial orthographic view of an inflatable tubular member according to the present invention.

Referring now to the drawings, and to FIGS. 5 and 6 in particular, an inflatable tube 100 according to the present invention for use in floatation devices, inflatable structures and the like, is illustrated. The inflatable tube 100 is preferably constructed of a single strip 102 of material. The strip 102 is preferably constructed of a woven fabric that is strong, flexible, light weight, puncture-resistant, abrasion-resistant, and impervious to air and water. A suitable fabric is woven and coated with elastomeric material. This arrangement results in enhanced air tightness for the interior of the tube 100 when inflated and reduces overall weight of the final product. It is to be understood, of course, that other materials and/or coatings can be used for the inflatable tube 100.

When cut, the strip 102 has an upper longitudinal edge 104, a lower longitudinal edge 106, a right side edge 108, and a left side edge 110, as viewed in FIG. 6. The edges 104–110 are preferably substantially straight. The right side edge 108 preferably extends at an angle $\phi_1$ of about 45° with respect to the lower edge 106, while the left side edge 110 preferably extends at an angle $\phi_2$ of about 45° with respect to the upper edge 104. The strip 102 is cut such that a first set of threads 107 of the woven material 102 extends in a warp direction 112 that is substantially parallel to the upper and lower edges 104, 106. A second set of threads 109 extends in a fill direction 114 that is substantially perpendicular to the upper and lower edges, while a bias direction 116 of the woven material is substantially parallel to the left and right side edges 110 and 108, prior to forming the tube 100. Depending on the desired warp, fill and bias directions with respect to the elongate edges, the angles $\phi_1$ and $\phi_2$ may vary. Moreover, the width and length of the strip 102, as well as the weight of the fabric and coating thickness may greatly vary depending on the particular application in which the inflatable tube 100 is used.

During formation of the inflatable tube 100, the strip 102 is spiraled around a central axis 122 such that the upper edge 104 abuts the lower edge 106 with the points $A_1$, $A_2$ and $A_3$ aligned with opposing points $B_1$, $B_2$ and $B_3$, respectively, along a common line 118 to thereby create a spiral or helical seam 120. Once the inflatable tube is formed as shown in FIG. 5, the warp direction 112 of the woven fabric is substantially parallel to the upper and lower edges 104, 106 and thus extends along the spiral seam 120. Likewise, the fill direction 114 is substantially perpendicular to the spiral seam, while the bias direction 116 is substantially parallel to a circumferential direction of the tube. Orientation of the bias direction 116 along the circumference of the tube 100 permits and enhances expansion or stretching of the tube in the circumferential direction when inflated. Further details of forming the inflatable tube 100 will be described below with respect to FIGS. 8 to 14.

Figure 7:
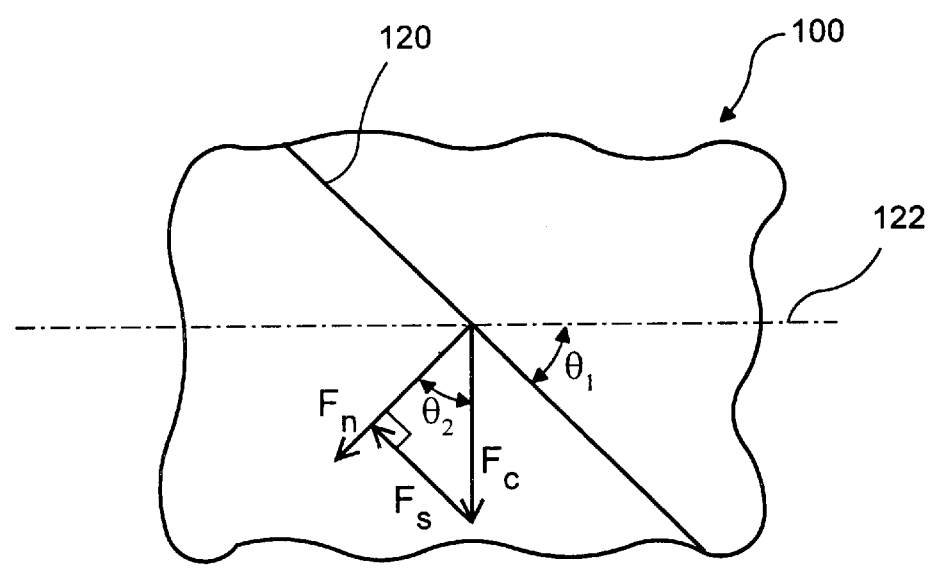
FIG. 7 shows an enlarged portion of the tubular member of FIG. 5 illustrating forces present at a helical seam of the tubular member when inflated.

Referring now to FIG. 7, the spiral seam 120 extends at an angle $\theta_1$ with respect to the central axis 122 of the inflatable tube 100. When the angles $\phi_1$ and $\phi_2$ are 45° (see FIG. 6), $\theta_1$ will also be 45°. The tube 100 and the seam 120 are subject to a circumferential force $F_c$ extending along the periphery of the structure when inflated. The circumferential force $F_c$ can be broken into a normal component of force $F_n$ that attempts to pull the seam 120 apart, and a shear component of force $F_s$ extending substantially parallel to the seam 120. The circumferential force $F_c$ extends at an angle $\theta_2$ with respect to the normal force $F_n$. With this orientation, a relationship is established between $F_n$ and $F_c$ as follows:

$$\cos\theta_2 = \frac{F_n}{F_c} \quad (1)$$

Solving for the normal force $F_n$ acting on the seam 120:

$$F_n = F_c \times \cos\theta_2 \quad (2)$$

It is known that $\theta_1$ equals $\theta_2$ as angles formed by mutually perpendicular lines. Thus, for example, when $\theta_1$ equals 45°, $\theta_2$ is also equal 45°. Substituting in the value for $\theta_2$ gives:

$$F_n = 0.707 F_c \quad (3)$$

Figure 3:
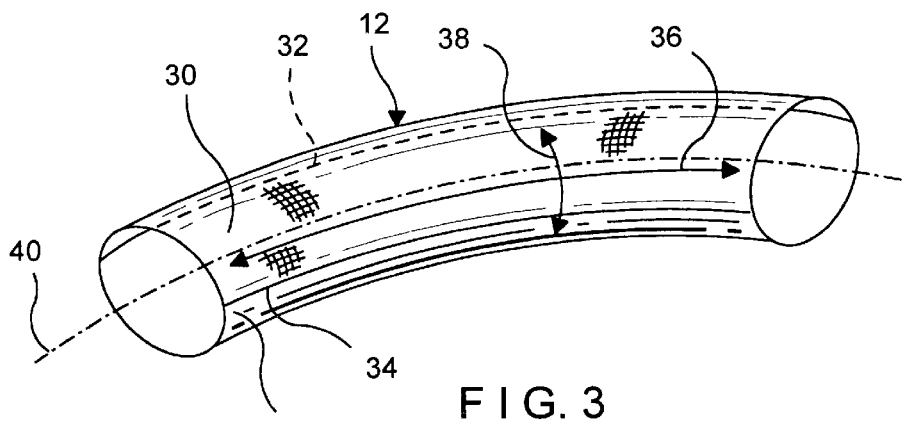
FIG. 3 is an enlarged view of a segment of the prior art annular floatation device of FIG. 1.
Figure 4:
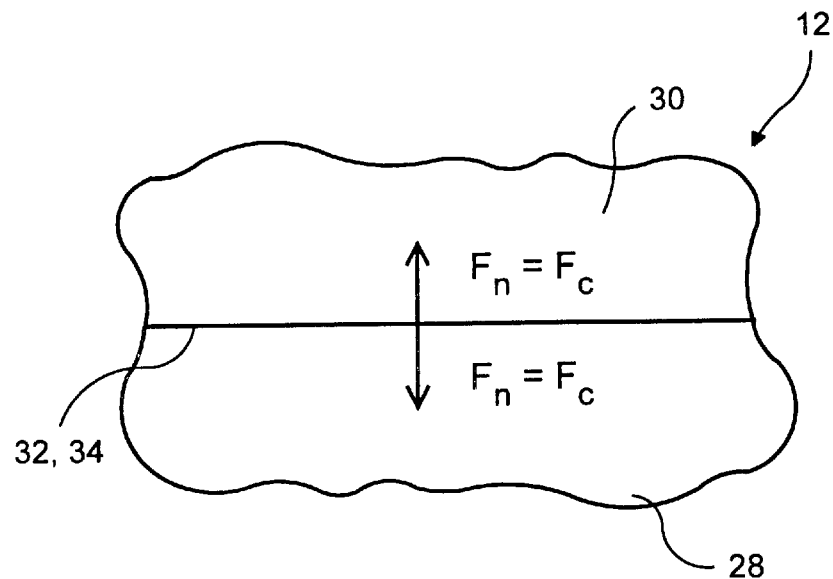
FIG. 4 shows an enlarged portion of the prior art annular floatation device of FIG. 1 illustrating forces present at a longitudinal seam of the tubular member when inflated.

In the diagram, $F_n$ is always of smaller value than $F_c$. Since the normal force $F_n$ tends to pull the seam 120 apart, the angle of the seam 120 with respect to the central axis 122 of the tube 100 causes the normal force $F_n$ to be significantly smaller than the circumferential force $F_c$ when the tube 100 is inflated, as seen from equation (3) above. This is a significant advantage of the spiroidal seam of the invention over the prior art, as illustrated in FIGS. 3 and 4, wherein the normal force $F_n$ is equal to the circumferential force $F_c$. Consequently, the spiroidal seam 120 of the invention is able to withstand substantially greater normal forces than the prior art when similar adhesive bonding techniques are used. However, the present invention affords even greater resistance to separation at the seam due to the manner in which the seam is formed, as will now be described.

FIGS. 8 to 14 illustrate a method of forming the inflatable tube 100. As shown in FIGS. 8 to 10, an inner elongated film or tape 130 is mounted to the inner surface 103 of the strip 102 adjacent the edge 106. The inner tape 130 overlaps the inner surface 103 and extends outwardly from the edge 106. Likewise, an outer elongated film or tape 132 is mounted to the outer surface 105 of the strip 102 adjacent the edge 104. The outer tape 132 overlaps the outer surface 105 and extends outwardly from the edge 104. The outer tape 132 is preferably constructed of the same material used for the strip 102, while the inner tape 130 is preferably made of an elastomeric material. The inner and outer tapes 130, 132 are preferably attached to the strip 102 through thermobonding, which will be described in greater detail below with respect to FIG. 14.

As shown in FIGS. 11 to 13, the strip 102 is spiraled around the central axis 122 such that the upper edge 104 abuts the lower edge 106 to form the seam 120. The inner tape 130 overlaps the seam 120, including the upper edge 104 and lower edge 106 on the inner surface 103. Likewise, the outer tape 132 overlaps the seam 120, including the upper edge 104 and lower edge 106 on the outer surface 105. The inner tape 130 and outer tape 132 are thermobonded to the inner and outer surfaces 103, 105, respectively, as shown in FIG. 13, to thereby create the unified tubular member 100.

Figure 14:
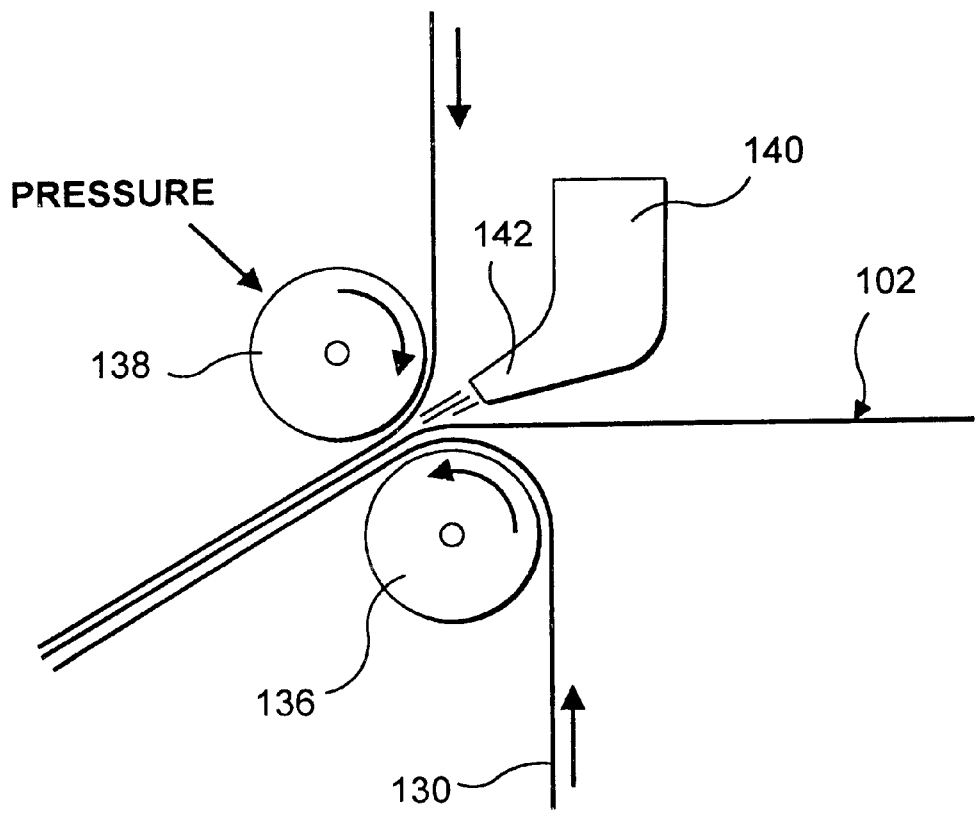
FIG. 14 is a schematic representation of a thermobonding process during assembly of the inflatable tubular member.

As shown in FIG. 14, the inner tape 130 and the outer tape 132 are preferably attached to the respective inner and outer surfaces 103, 105 through a thermobonding process. In this process, the inner tape 130, outer tape 132, and strip 102 are fed between a lower feed roller 136 and an upper feed roller 138. The rollers apply pressure to the tapes and the strip 102. A heat source 140 having a nozzle 142 blows a heating fluid, such as for example, heated air, onto the inner and outer tapes 130, 132, and the strip 102. The combined pressure and heat thermally bonds the inner and outer tapes to the strip 102 as the strip is spiraled into a tubular shape. The seam 120, including the upper and lower edges 104, 106 of the strip 102, and the inner and outer tapes 130, 132, are preferably fed linearly during the thermobonding process.

Instead of a forced air heating arrangement, the strip and tapes may be heated to the desired thermobonding temperature by thermal feed rollers.

Once the inflatable tube 100 is formed, the inner tape 130 situated on the inner surface 103 assures the integrity of the tube against air leakage at the seam 120, while the outer tape 132 situated on the outer surface 105 provides mechanical strength along the spiral seam 120. The enhanced mechanical strength provided by the outer tape 132 combined with the angle of the spiral seam 120 with respect to the central axis 122, as discussed above, significantly increases the strength the spiral seam. Since the outer tape 132 is constructed of the same woven fabric as the strip 102, the threads (not shown) of the tape run parallel and perpendicular to the warp and fill directions of the strip 102, and thus the seam 120. The threads of the tape oriented parallel to the seam 120 provide resistance against any shear forces $F_s$ (FIG. 7) along the seam, while the threads of the tape that are oriented perpendicular to the seam 120 resist normal forces $F_n$.

The single spiral seam 120 reduces assembly time when compared to the prior art inflatable structures with multiple seams. In addition, the thermobonding process of the present invention is advantageous over the prior art since it is no longer necessary to wait several hours before forming another seam or testing the tubular structure. Thermobonding allows almost immediate testing of the formed tubular member since no curing time is involved as in the prior art. This results in a substantial savings in time, materials, and manufacturing costs.

Referring now to FIG. 15, an inflatable escape slide or raft 150 for emergency aircraft evacuation using inflatable tubes 100 according to the present invention is illustrated.

The inflatable evacuation slide 150 includes a pair of longitudinal support structures 170, 172 connected together by an upper transverse support 174 at the upper end 160 and a lower cross support (not shown) at the lower end 162. Each of the longitudinal support beams 170, 172 comprises the inflatable tubes 100 with spiral seams 120. Likewise, each of the upper and lower transverse supports comprises a single inflatable tube 100. The inflatable tubes are fluidly and mechanically connected to each other at corner seams 180 to thereby form a continuous air passage through the side supports and cross supports. A floor 182 extends between the longitudinal supports 170, 172 and the transverse supports and is bonded or otherwise attached thereto. The floor 182 is constructed of a flexible material that forms a taut membrane when the escape slide is inflated and is sufficiently strong to support the weight of evacuees during use.

However, it should be noted that a composite inflatable escape slide consisting of the inflatable tubes having spiral seams as well as conventionally assembled inflatable tubes is within the scope of the invention. For example, the longitudinal support beams 170 and 172 can be manufactured having the spiral seams whereas the upper and lower transverse supports can be manufactured by using the conventional technology. In another embodiment, the longitudinal support beams can be put together through utilization of linear multiple seams and the upper and lower transverse supports can be made with the spiral seams as disclosed by the invention.

The surfaces of the escape slide, and especially the surfaces of the inflatable tubes 100, must be strong and formed from a fabric having high puncture and abrasion resistance. The possibility of puncture or other damage is highest at the seams 120 of the inflatable tubes 100. By providing the seams with the construction as disclosed hereinabove, the present invention substantially reduces the possibility of puncture or other damage, especially to the seams 120, and therefore the possibility of rupturing the tubes.

Although the escape slide 150 has been represented by a particular tubular shape and configuration, other shapes and configurations are contemplated. For example, the side supports may each be constructed of a single inflatable tube 100, while one or more cross supports may be eliminated or replaced with rigid support members. Moreover, the escape slide 150 can be used in other environments besides aircraft, such as watercraft, oil rigs, buildings, and so on.

With reference now to FIG. 16, an inflatable device 200 comprises a single inflatable tube 100 having a spiral seam 120 constructed in the same manner as described above with respect to FIGS. 8 to 13. The inflatable tube 100 forms a continuous air passage throughout the interior of the inflatable device 200. If the inflatable device 200 is constructed as a life raft, a floor 218 extends underneath the inflatable tube 100 and is bonded or otherwise attached thereto. The floor 218 is preferably constructed of a flexible material that forms a taut membrane when the life raft is inflated and is sufficiently strong to support the weight of evacuees during use. If the inflatable device is constructed as an annular floatation device only, such as an emergency float for a single user, the floor 218 may be eliminated.

Figure 1:
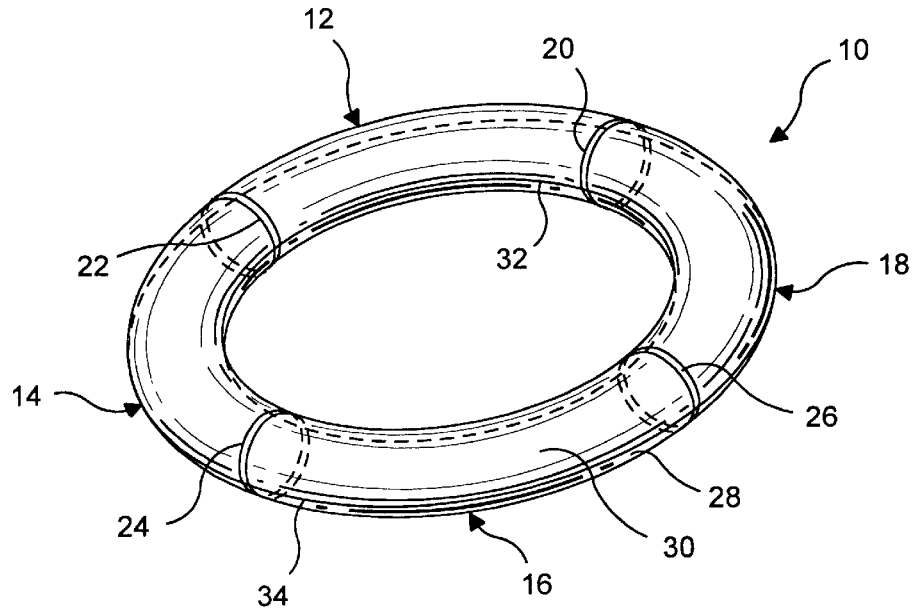
FIG. 1 is an orthographic view of a prior art annular inflatable floatation device.
Figure 2:
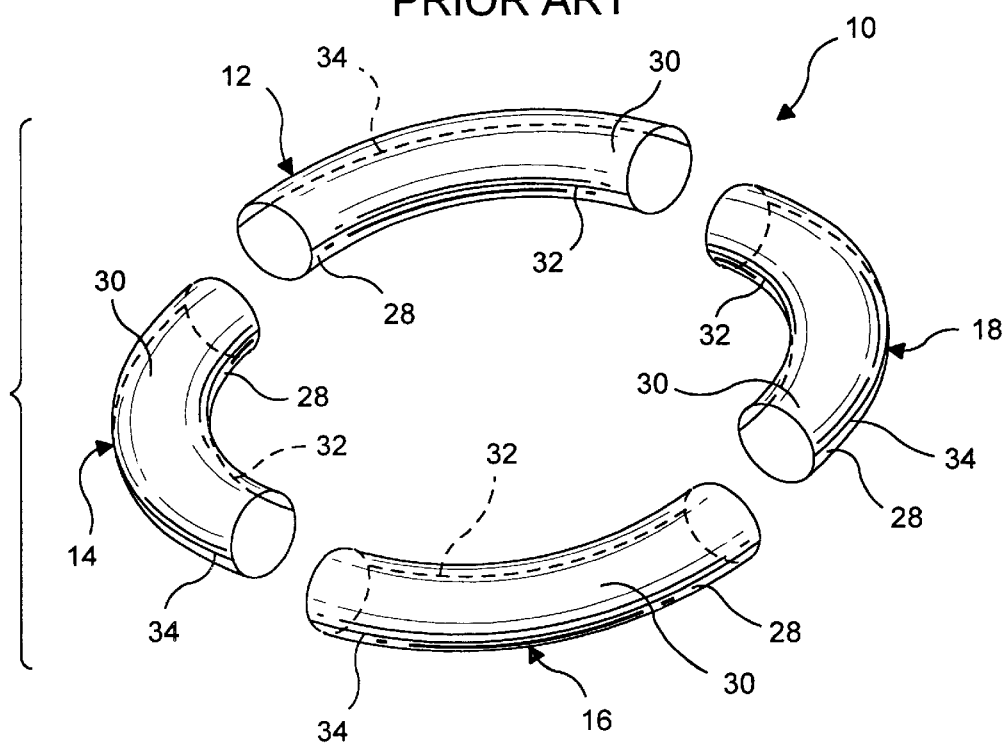
FIG. 2 is an exploded orthographic view of the prior art annular inflatable floatation device of FIG. 1.

With this arrangement, the number of seams is substantially reduced when compared to the prior art shown in FIG. 1. This significantly reduces the chances of seal leakage, especially at seal intersections, and reduces assembly time when compared to the prior art inflatable structures with multiple seams.

Moreover, the arrangement of the inner and outer strips at the seam 120 as discussed above provides greater resistance to seam failure. The thermobonding process is also advantageous over the prior art since it is no longer necessary to wait several hours before forming another seam or testing the tubular structure. Thermobonding allows almost immediate testing of the formed tubular member since no curing time is involved as in the prior art. This results in a substantial savings in time, materials, and manufacturing costs.

It is to be understood that the terms upper, lower, right, left, inner, outer, and their respective derivatives as used herein refer to relative, rather than absolute positions.

While the invention has been taught with specific reference to the above-described embodiments, those skilled in the art will recognize that changes can be made in form and detail without departing from the spirit and the scope of the invention. For example, the strip 102 can have varying length, width, thickness, weight, and weave type. Thermobonding can be substituted by any suitable means of securing the spiral seam. Moreover, the fabric material, coating material, etc., can vary depending on the particular application for the inflatable tube. The inflatable tube 100 can be formed into any desired shape and size and can be formed into floatation devices, emergency evacuation devices, swimming pools, temporary shelters, or any other inflatable device. Thus, the described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An inflatable evacuation device comprising:

at least first and second inflatable tubular members;

the first inflatable tubular member being spaced from the second inflatable tubular member, a floor extending between the first and second inflatable tubular members and being constructed of a flexible material;

each of the first and second inflatable tubular members being constructed of an elongate flexible strip of woven fabric, the elongate strip having a first elongate edge and a second elongate edge extending substantially parallel to the first elongate edge, the elongate flexible strip of woven fabric includes a first set of threads extending in a warp direction and a second set of threads extending in a fill direction substantially transverse to the warp direction, a bias direction of the woven fabric extends at an angle to the warp and fill directions; and the elongate strip being spiraled into a tubular shape such that the first elongate edge is adjacent the second elongate edge to thereby form a spiral seam extending along a longitudinal axis of the respective tubular member;

wherein in each of the first and second tubular members the warp direction is substantially parallel to the spiral seam, and to enhance expansion the bias direction extends along a circumference of each tubular member.

2. An inflatable evacuation device according to claim 1, wherein each tubular member includes an inner surface and an outer surface, and further comprising a first elongate tape member bonded to one of the inner and outer surfaces of each tubular member along the spiral seam.

3. An inflatable evacuation device according to claim 2, and further comprising a second elongate tape member bonded to the other of the inner and outer surfaces of each tubular member along the spiral seam.

4. An inflatable evacuation device according to claim 2, wherein the first tape member is thermobonded to the one surface of each tubular member.

5. An inflatable evacuation device according to claim 3, wherein the first and second tape members are thermobonded to the inner and outer surfaces, respectively, of each tubular member.

6. An inflatable evacuation device according to claim 1, wherein the fill direction is substantially normal to the spiral seam.

7. An inflatable evacuation device according to claim 1, wherein the strip of woven fabric is substantially impervious to air and water and the bias direction of the woven fabric extends within a plane substantially normal to the longitudinal axis of each tubular member.

8. An inflatable evacuation device according to claim 1, wherein the bias direction extends substantially parallel to the direction of a circumferential force extending along a periphery of the respective tubular member when inflated.

9. An inflatable evacuation device according to claim 1, wherein the first and second sets of threads of the woven fabric are constructed of nylon.

10. An inflatable evacuation device according to claim 9, and further comprising a layer of elastomeric material on an inner and outer surface of each tubular member.

11. An inflatable evacuation device according to claim 10, wherein the elastomeric material comprises polyurethane.

12. An inflatable evacuation device according to claim 10, wherein the layer of elastomeric material on the inner surface is thicker than the layer of elastomeric material on the outer surface.

13. An inflatable evacuation device according to claim 5, wherein the first elongate tape member is constructed of an elastomeric material.

14. An inflatable evacuation device according to claim 5, wherein the first elongate tape member is constructed of polyurethane.

15. An inflatable evacuation device according to claim 14, wherein the second elongate tape member is constructed of a woven fabric coated with an elastomeric material.

16. An inflatable annular floating structure comprising: an annular inflatable tubular member, a floor connected thereto, the floor being constructed of a flexible material;

the annular inflatable tubular member being constructed of an elongate flexible strip of woven fabric, the elongate strip having a first elongate edge and a second elongate edge extending substantially parallel to the first elongate edge, the elongate flexible strip of woven fabric includes a first set of threads extending in a warp direction, a second set of threads extending in a fill direction substantially transverse to the warp direction, a bias direction of the fabric extends at an angle to the warp and fill directions; and the elongate strip being spiraled into a tubular shape such that the first elongate edge is adjacent the second elongate edge to thereby form a spiral seam extending along a longitudinal axis of the annular tubular member so as to form inner and outer tubular surfaces;

wherein the warp direction is substantially parallel to the spiral seam and to enhance expansion the bias direction extends along a circumference of the annular inflatable tubular member.

17. An inflatable annular floating structure according to claim 16, wherein the fill direction is substantially normal to the spiral seam.

18. An inflatable annular floating structure according to claim 16, wherein the elongate flexible strip of woven fabric that is substantially impervious to air and water, the bias direction extends within a plane substantially normal to the longitudinal axis of the annular tubular member when inflated.

19. An inflatable annular floating structure according to claim 16, wherein the bias direction extends substantially parallel to the direction of a circumferential force extending along a periphery of the annular tubular structure when inflated.

20. An inflatable annular floating structure according to claim 16, wherein a first elongate tape member bonded to one of the inner and outer surfaces of the tubular member along the spiral seam.

21. An inflatable annular floating structure according to claim 20, and further comprising a second elongate tape member bonded to the other of the inner and outer surfaces of the tubular member along the spiral seam.

22. An inflatable annular floating structure according to claim 21, and further comprising a layer of elastomeric material on the inner and outer surfaces of the tubular member.

23. An inflatable structure according to claim 21, wherein the first elongate tape member is bonded to the inner surface of the tubular member along the spiral seam for sealing the spiral seam against leakage and said second elongate tape member being bonded to the outer surface of the tubular member along the spiral seam for reinforcing the spiral seam.

24. An inflatable annular floating structure according to claim 23, wherein the first and second elongate tape members are thermobonded to the inner and outer surfaces, respectively, of the tubular member.

25. An inflatable annular floating structure according to claim 23, wherein the first elongate tape member is constructed of an elastomeric material and the second elongate tape member is constructed of a woven fabric having an elastomeric coating.

26. An inflatable annular floating structure according to claim 25, wherein a width of the s econd elongate tape member is greater than a width of the first elongate tape member.

* * * * *